United States Patent
Shi et al.

(10) Patent No.: US 8,112,045 B2
(45) Date of Patent: *Feb. 7, 2012

(54) TRANSLATIONAL LOOP TRANSMITTER ARCHITECTURE EMPLOYING CHANNEL POWER RATIO MEASUREMENTS FOR MODULATION ACCURACY CALIBRATION

(75) Inventors: Hong Shi, Redondo Beach, CA (US); Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 12/336,830

(22) Filed: Dec. 17, 2008

(65) Prior Publication Data

US 2009/0093224 A1 Apr. 9, 2009

Related U.S. Application Data

(63) Continuation of application No. 11/078,148, filed on Mar. 11, 2005, now Pat. No. 7,499,680.

(51) Int. Cl.
  *G06F 15/16* (2006.01)
(52) U.S. Cl. .......................... 455/84; 455/116
(58) Field of Classification Search .............. 455/84, 455/116, 115.1, 118, 126
See application file for complete search history.

(56) References Cited

U.S. PATENT DOCUMENTS

| 5,193,223 | A  | * | 3/1993  | Walczak et al. | 455/115.1 |
| 5,697,072 | A  | * | 12/1997 | Shibata | 455/115.3 |
| 6,049,703 | A  | * | 4/2000  | Staudinger et al. | 455/114.3 |
| 6,078,628 | A  | * | 6/2000  | Griffith et al. | 375/300 |
| 6,349,216 | B1 | * | 2/2002  | Alberth et al. | 455/550.1 |
| 6,366,177 | B1 | * | 4/2002  | McCune et al. | 332/103 |
| 6,658,065 | B1 | * | 12/2003 | Della Torre et al. | 375/296 |
| 2003/0045250 | A1 | * | 3/2003  | Haapoja | 455/126 |
| 2003/0072388 | A1 | * | 4/2003  | Francos et al. | 375/296 |

* cited by examiner

*Primary Examiner* — Sam Bhattacharya
(74) *Attorney, Agent, or Firm* — Garlick Harrison & Markison; Holly L. Rudnick

(57) ABSTRACT

A Radio Frequency RF transmitter includes a translational loop architecture that supports non-constant envelope modulation types and includes by adjusting the envelope of the translational loop at the translational loop output. The RF transmitter includes an Intermediate Frequency (IF) modulator, a translational loop, an envelope time delay adjust block, an envelope adjust block, and a time delay calibration block. The IF modulator receives a modulated baseband signal and produces a modulated IF signal having a non-constant envelope. The translational loop receives the modulated IF signal and produces a modulated RF signal having a constant envelope. The envelope time delay adjust block receives an envelope signal corresponding to the original modulated signal and produces a time delayed envelope signal based upon a time delay control signal. The envelope adjust block adjusts the modulated RF signal based upon the time delayed envelope signal to produce an envelope adjusted modulated RF signal. Finally, the time delay calibration block receives the envelope adjusted modulated RF signal and produces the time delay control signal.

25 Claims, 10 Drawing Sheets

TRANSLATIONAL LOOP TRANSMITTER ARCHITECTURE EMPLOYING CHANNEL POWER RATIO MEASUREMENTS FOR MODULATION ACCURACY CALIBRATION

CROSS REFERENCE TO RELATED APPLICATIONS

This application is a continuation of and claims priority to U.S. patent application Ser. No. 11/078,148, filed Mar. 11, 2005; which application is a continuation of and claims priority to U.S. patent application Ser. No. 10/066,843, filed Feb. 4, 2002, now U.S. Pat. No. 6,882,831; which application claims priority to U.S. Provisional Patent Application No. 60/338,000, filed Dec. 7, 2001; and in which all above listed applications are incorporated by reference herein.

FIELD OF THE INVENTION

This invention relates generally to wireless communications; and more particularly to the operation of a Radio Frequency (RF) transmitter within a component of a wireless communication system.

BACKGROUND OF THE INVENTION

The structure and operation of wireless communication systems is generally known. Examples of such wireless communication systems include cellular systems and wireless local area networks, among others. Equipment that is deployed in these communication systems is typically built to support standardized operations, i.e. operating standards. These operating standards prescribe particular carrier frequencies, modulation types, baud rates, physical layer frame structures, MAC layer operations, link layer operations, etc. By complying with to these operating standards, equipment interoperability is achieved.

In a cellular system, a governmental body licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscribers' subscriber units within the service area. These channels are typically equally spaced across the licensed spectrum. The separation between adjacent carriers is defined by the operating standards and is selected to maximize the capacity supported within the licensed spectrum without excessive interference. In most cases, severe limitations are placed upon the amount of adjacent channel interference that may be caused by transmissions on a particular channel.

In cellular systems, a plurality of base stations is distributed across the service area. Each base station services wireless communications within a respective cell. Each cell may be further subdivided into a plurality of sectors. In many cellular systems, e.g., GSM cellular systems, each base station supports forward link communications (from the base station to subscriber units) on a first set of carrier frequencies and reverse link communications (from subscriber units to the base station) on a second set carrier frequencies. The first set and second set of carrier frequencies supported by the base station are a subset of all of the carrier frequencies within the licensed frequency spectrum. In most, if not all cellular systems, carrier frequencies are reused so that interference between base stations using the same carrier frequencies is minimized but so that system capacity is increased. Typically, base stations using the same carrier frequencies are geographically separated so that minimal interference results.

Both base stations and subscriber units include Radio Frequency (RF) transmitters and RF receivers, together "RF transceivers." RF transceivers service the wireless links between the base stations and subscriber units. The RF transmitter receives a baseband signal from a baseband processor, converts the baseband signal to an RF signal, and couples the RF signal to an antenna for transmission. In most RF transmitters, because of well-known limitations, the baseband signal is first converted to an Intermediate Frequency (IF) signal and then the IF signal is converted to the RF signal. The RF receiver receives an RF signal, converts the RF signal to an IF signal, and then converts the IF signal to a baseband signal, which it then provides to the baseband processor.

The fast growth of the mobile communications market demands multi-band RF transceivers that are small in size, low in cost, and have low power consumption. These market demands require that the architecture of the RF transceiver to be suitable for a high level of system integration on a single chip for reduced cost and miniaturized mobile device size. Low power consumption is very critical for increasing mobile device battery life and is very important for small mobile devices that include small batteries. To meet these design challenges, some RF transmitters now use translational loop architecture to convert the IF signal to an RF signal. Translational loop architectures are useful for constant envelope modulated wireless systems, such as the new generation Global Standards for Mobile Communications (GSM) and General Packet Radio System (GPRS) phones that employ Gaussian Minimum Shift Keying (GMSK) modulation. However, so far, the translational loop architecture has not been successfully applied in systems that employ a non-constant envelope modulation format, such as QPSK for CDMA (IS-95) and US-TDMA (IS-136) standardized systems, for 8-PSK for EDGE standard based mobile devices, and for mobile devices that support other non-constant envelope modulation formats, such as 16 QAM, 32 QAM, 64 QAM, 128 QAM, etc.

Thus, there is a need in the art for a lower power consumption RF transmitter that supports both constant envelope modulation formats and non-constant envelope formats, among other shortcomings of the prior devices.

SUMMARY OF THE INVENTION

Thus, in order to overcome the above-described shortcomings as well as other shortcomings of the present devices and methodologies, an RF transmitter constructed according to the present invention includes a translational loop architecture that supports non-constant envelope modulation types, e.g., QPSK, 8-PSK, 16 QAM, 32 QAM, 64 QAM, 128 QAM, etc. The translational loop architecture of the present invention adjusts the envelope of the translational loop so that it supports non-constant envelope modulation types. The RF transmitter may be contained in a mobile device or a stationary device.

In particular, the RF transmitter includes an Intermediate Frequency (IF) modulator, a translational loop, an envelope time delay adjust block, an envelope adjust block, and a time delay calibration block. The IF modulator receives a modulated baseband signal and produces a modulated IF signal having a non-constant envelope. The translational loop receives the modulated IF signal and produces a modulated RF signal having a constant envelope. The envelope time delay adjust block receives an envelope signal corresponding to the modulated signal and produces a time delayed envelope signal based upon a time delay control signal. The envelope adjust block adjusts the modulated RF signal based upon the time delayed envelope signal to produce an envelope adjusted modulated RF signal. Finally, the time delay calibration block receives the envelope adjusted modulated RF signal and produces the time delay control signal.

In one embodiment, the time delay calibration block includes a down converter, an Analog to Digital Converter (ADC), a Low Pass Filter (LPF), a Band Pass Filter (BPF), and a level detector and control block. The down converter converts the envelope adjusted modulated RF signal to a complex baseband signal. The ADC samples the complex baseband signal. The LPF couples to the ADC and filters the complex baseband signal to produce a LPF output. The BPF also couples to the ADC and filters the complex baseband signal to produce a BPF output. With this structure, the level detector and control block receives the LPF output and the BPF output and produces the time delay control signal based upon the LPF output and the BPF output. These components of the RF transmitter may be embodied within resources resident in a coupled baseband processor.

The time delay calibration block of the RF transmitter determines a channel power corresponding to the RF signal. The time delay calibration block also determines an alternate channel power that is emitted by the same transmitting signal corresponding to an alternate channel or adjacent channel. The time delay calibration block then determines the time delay control signal based upon a ratio of the channel power and the alternate channel power.

The RF transmitter may also include an envelope detection block that produces the envelope signal. In one embodiment, the envelope detection block determines the envelope signal based upon the complex baseband signal received from the baseband processor (not the complex baseband signal generated within the time delay calibration block). In another embodiment, the envelope detection block determines the envelope signal based upon the modulated IF signal. In still another embodiment, the envelope detection block receives the envelope signal from a coupled baseband processor.

In at least some embodiments, the envelope signal produced by the envelope detection block is a digital signal while the time delayed envelope signal is an analog signal. With this signal format, the time delay block delays a digital envelope signal by a delay that is based upon the time delay control signal. Then, a digital to analog converter receives the output of the time delay block and produces the time delayed envelope signal.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1A:
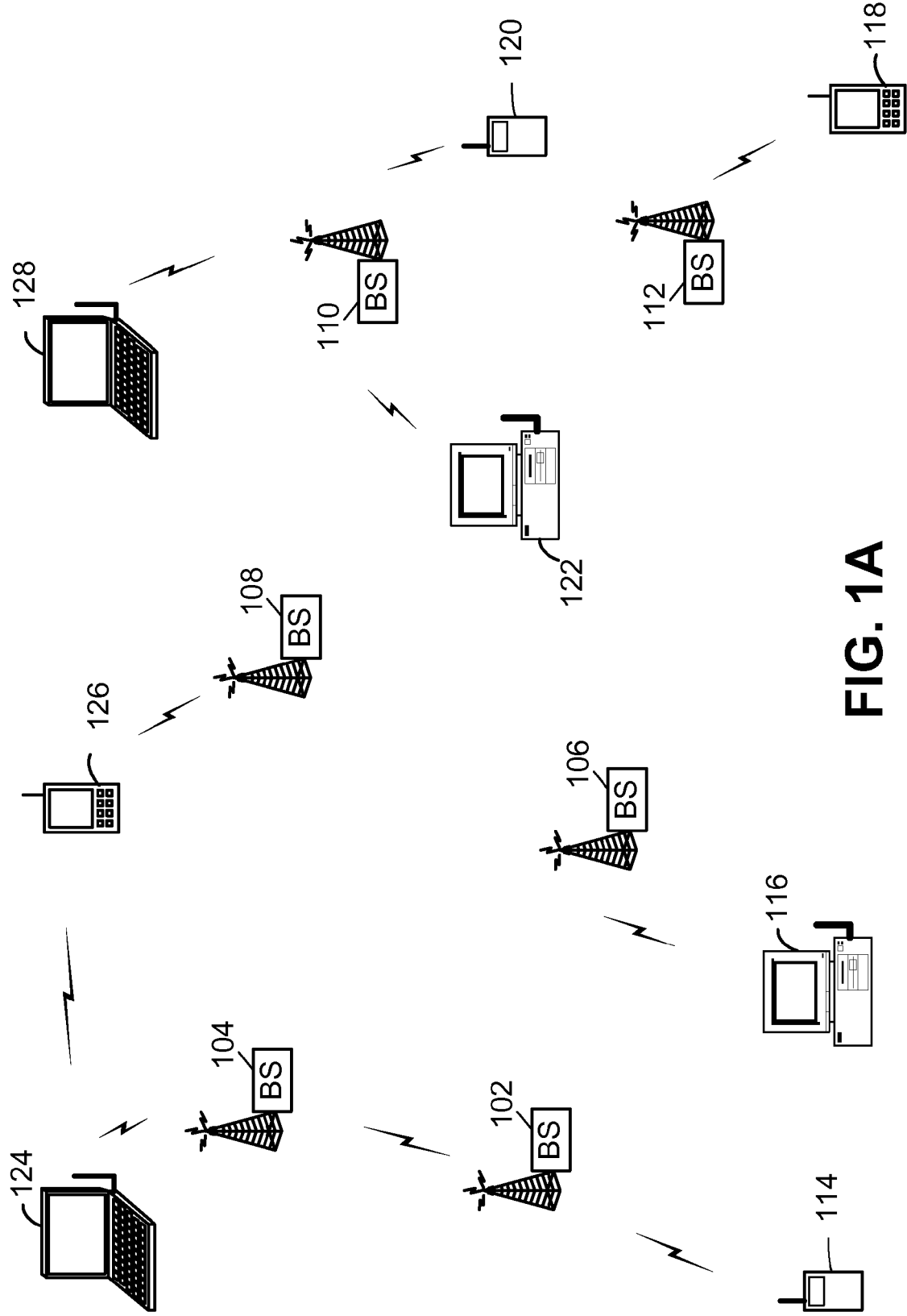
FIG. 1A is a system diagram illustrating a cellular system within which the present invention is deployed.

FIG. 1A is a system diagram illustrating a cellular system within which the present invention is deployed. The cellular system includes a plurality of base stations 102, 104, 106, 108, 110, and 112 that service wireless communications within respective cells/sectors. The cellular system services wireless communications for a plurality of wireless subscriber units. These wireless subscriber units include wireless handsets 114, 118, 120, and 126, mobile computers 124 and 128, and desktop computers 116 and 122. When wirelessly communicating, each of these subscriber units communicates with one (or more during handoff) of the base stations 102 through 112. Each of the subscriber units 114-128 and each of the base station 102-112 include radio frequency (RF) circuitry constructed according to the present invention.

The RF circuitry of the present invention may be contained in any of the subscriber units 114-128, any of the base stations 102-112 or in another wireless device, whether operating in a cellular system or not. Thus, for example, the teachings of the present invention may be applied to wireless local area networks, two-way radios, satellite communication devices, or other devices that support wireless communications.

The RF circuitry of the present invention supports both constant envelope and non-constant envelope modulation types. The RF transmitter section of this RF circuitry supports non-constant envelope modulation formats such as QPSK for CDMA (IS-95) and US-TDMA (IS-136) standardized systems and 8-PSK for EDGE standardized systems. The RF transmitter of the present invention also supports other non-constant envelope modulation types, e.g., QPSK, 8-PSK, 16 QAM, 32 QAM, 64 QAM, 128 QAM, etc, whether standardized or not. The structure and operation of the RF transmitter is described further with reference to FIGS. 2-10B The structure and operation of the RF transmitter of the present invention may also be implemented to service other wireless communications as well. For example, the RF transmitter may be used to service premises based Wireless Local Area Network (WLAN) communications, e.g., IEEE 802.11a and IEEE 802.11b communications, and ad-hoc peer-to-peer communications, e.g., Bluetooth. In a WLAN system, the structure would be similar to the structure shown in FIG. 1A but, instead of the base stations 102-112, the WLAN system would include a plurality of Wireless Access Points (WAPs). Each of these WAPs would service a corresponding area within the serviced premises and would wirelessly communicate with serviced wireless devices. For peer-to-peer communications, such as those serviced in Bluetooth applications, the RF transmitter of the present invention would support communications between peer devices, e.g., lap top computer 124 and hand-held wireless device 126.

Figure 1B:
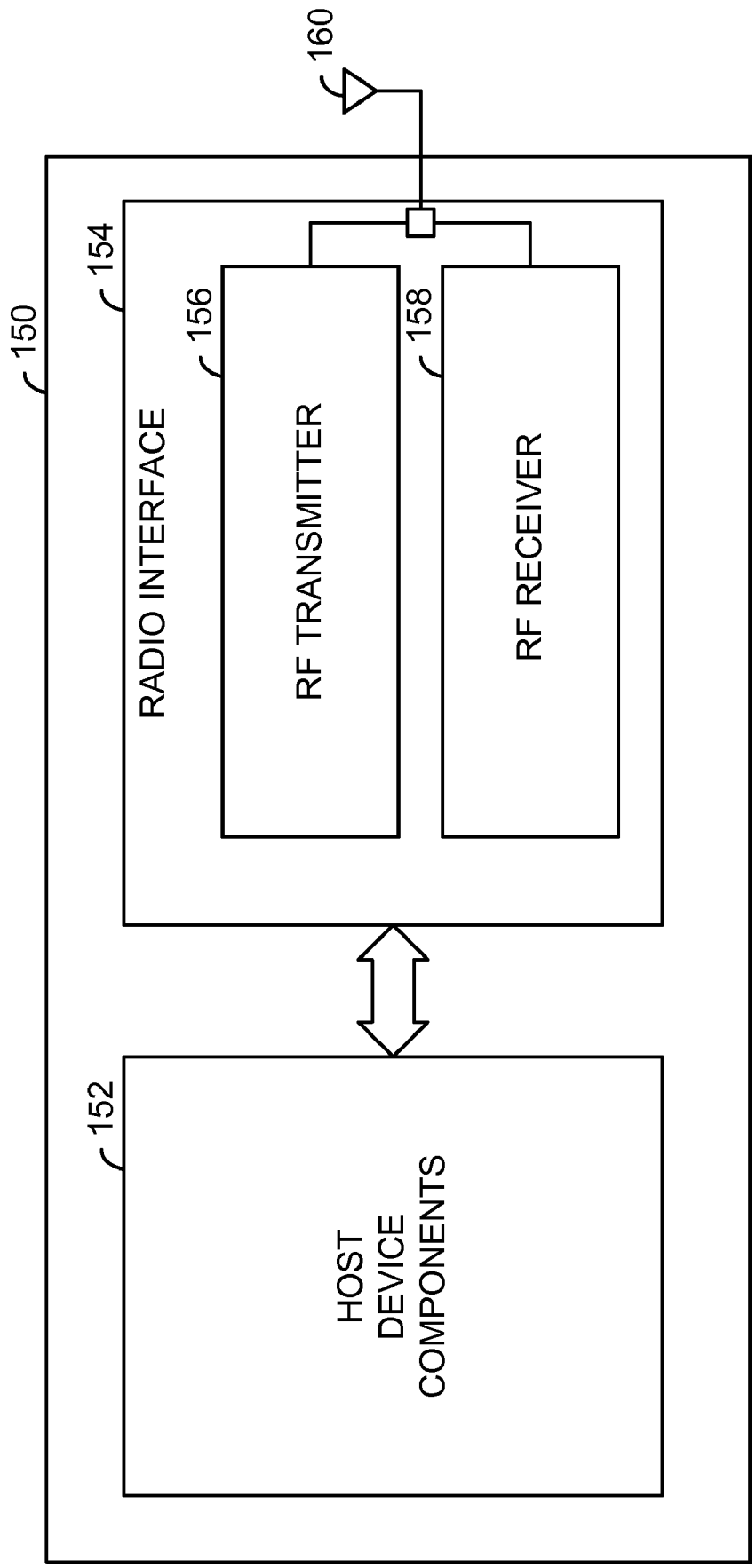
FIG. 1B is a block diagram generally illustrating the structure of a wireless device constructed according to the present invention.

FIG. 1B is a block diagram generally illustrating the structure of a wireless device 150 constructed according to the present invention. The general structure of the wireless device 150 will be present in any of the wireless devices 114-128 illustrated in FIG. 1A. The wireless device 150 includes a plurality of host device components 152 that service all requirements of the wireless device 150 except for the RF requirements of the wireless device 150. Of course, operations relating to the RF communications of the wireless device 150 will be partially performed by the host device components 152.

Coupled to the host device components 152 is the RF interface 154. The RF interface 154 services the RF communications of the host device 150 and includes an RF transmitter 156 and an RF receiver 158. The RF transmitter 156 and the RF receiver 158 both couple to an antenna 160. One particular structure of a host device is described with reference to FIG. 8. Further, the teachings of the present invention are embodied within the RF transmitter 156 of the RF interface 154.

Figure 2:
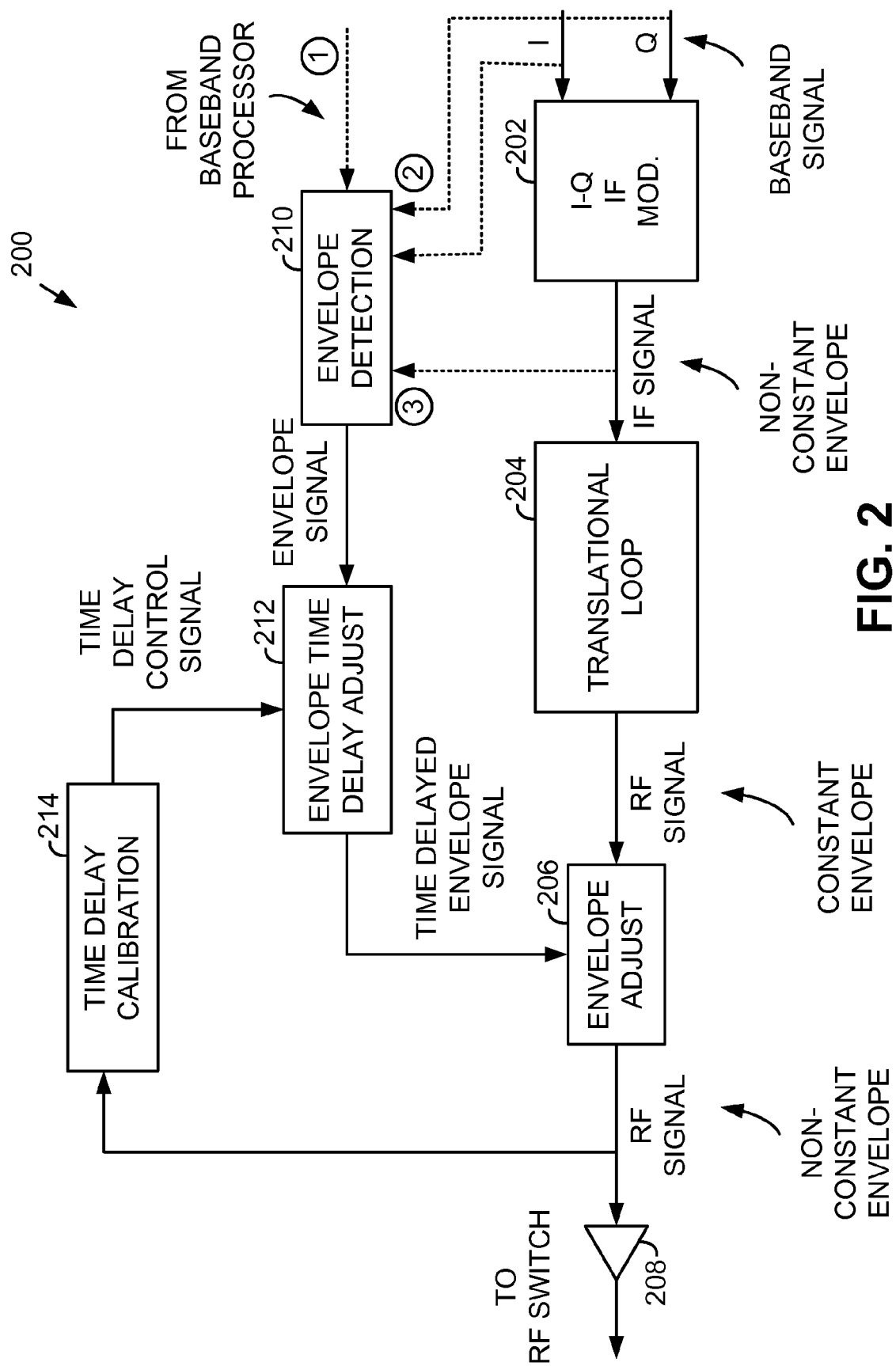
FIG. 2 is a block diagram illustrating a Radio Frequency (RF) transmitter constructed according to the present invention.

FIG. 2 is a block diagram illustrating an RF transmitter 200 constructed according to the present invention. The RF transmitter 200 includes an I-Q Intermediate Frequency (IF) modulator 202 that receives an I-Q baseband signal from a baseband processor and converts the I-Q represented baseband signal into a modulated IF signal. The modulated IF signal produced by the I-Q IF modulator serves as the input to a translational loop 204. The translational loop 204 produces an RF signal at the Transmit (TX) frequency that is received by an envelope adjust block 206. Note that the modulated IF signal received by the translational loop 204 is a non-constant envelope signal (corresponding to a non-constant envelope modulation type) while the RF signal output by the translational loop 204 is a constant envelope signal. The envelope adjust block 206 adjusts the envelope of the RF signal produced by the translational loop 204 based upon a time delayed envelope signal. The envelope adjust block 206 produces an envelope adjusted RF signal that is amplified by Power Amplifier (PA) 208. The output of the PA 208 is applied to an RF switch, a RF filter or a duplexer that couples the amplified envelope adjusted RF signal to an antenna.

An envelope detection block 210, an envelope time delay adjust block 212, and a time delay calibration block 214 work in cooperation to produce the time delayed envelope signal. Envelope detection block 210 detects the envelope of the IF signal using one of three (or more) techniques/embodiments. In a first embodiment, the envelope detection block 210 receives an envelope indication from a coupled baseband processor. In a second embodiment, the envelope detection block 210 measures I and Q components of the baseband signal at the input of the I-Q IF modulator to calculate the envelope. In a third embodiment, the envelope detection block 210 measures the envelope of the IF signal at the output of the I-Q IF modulator 202.

The envelope signal, which represents a magnitude of the modulated signal, is output by the envelope detection block 210 and received by the envelope time delay adjust block 212. The envelope time delay adjust block 212 outputs a time delayed envelope signal. The time delayed envelope signal, with respect to the envelope signal, has been delayed so that it correctly corresponds to the RF signal output of the translational loop 204. Thus, the delay introduced by the envelope adjust time delay 212 corresponds to the delay introduced by the translational loop 204, and in addition, the delay introduced by the I-Q IF modulator 202 when the envelope is detected from the baseband signal at the input to the I-Q IF modulator 202. Thus, the RF signal output of the envelope adjust block 206 is a phase and magnitude matched RF signal having a non-constant envelope.

A time delay calibration block 214 adjusts the delay introduced into the detected envelope by the envelope time delay adjust block 212. The operation of the time delay calibration block 214 will be described in detail with reference to FIGS. 3-6 and 9-10B. Generally speaking, the time delay calibration block 214 adjusts the time delay introduced by the envelope time delay adjust block 212 until the ratio of the signal level within a subject channel to the signal level of an adjacent channel (or an alternate channel) satisfies the operating requirements of the RF transmitter 200.

Figure 3:
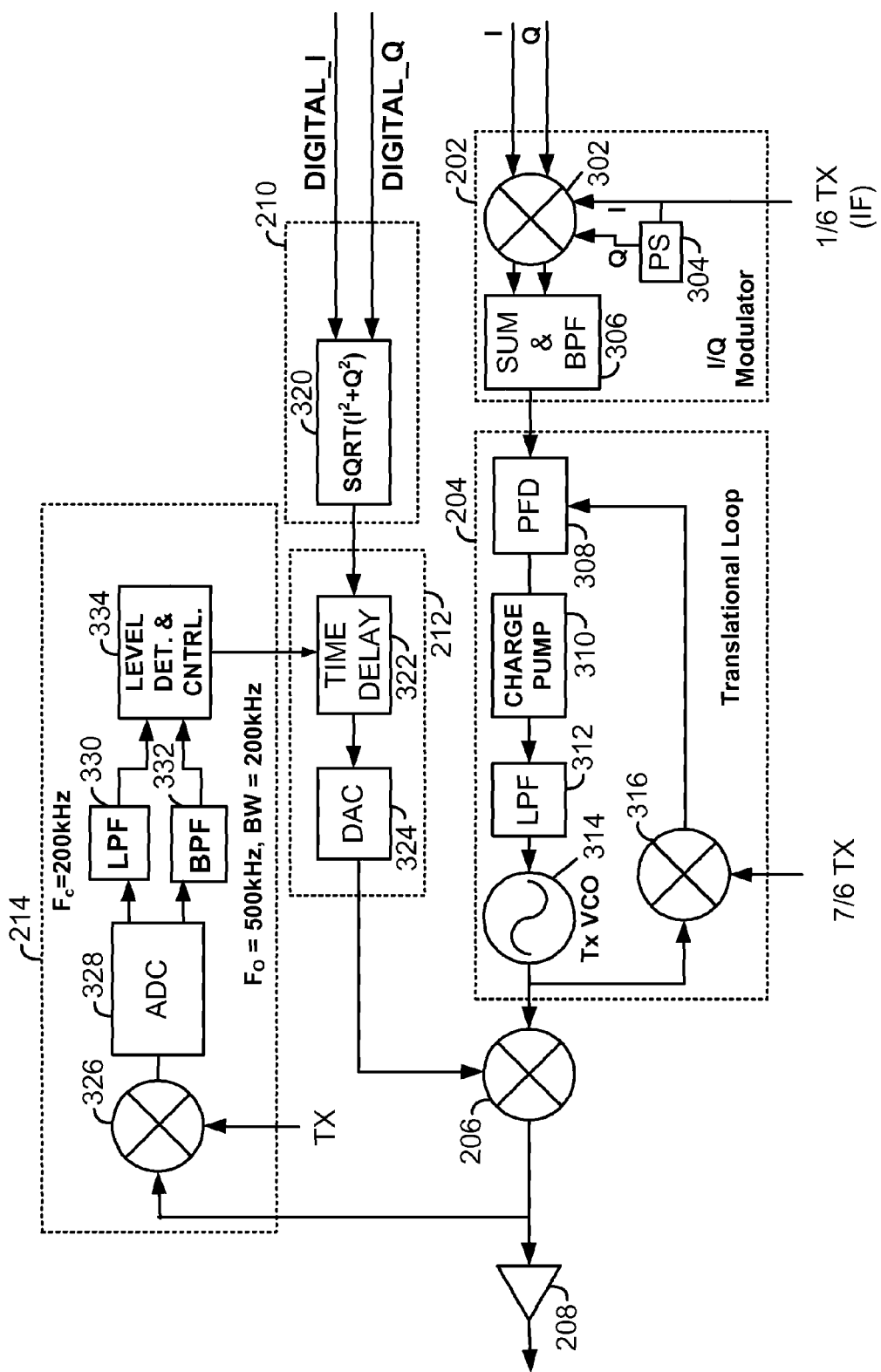
FIG. 3 is a block diagram illustrating in more detail the RF transmitter of FIG. 2.

FIG. 3 is a block diagram illustrating in more detail the RF transmitter 200 of FIG. 2. As shown, the I-Q IF modulator 202 receives an IF reference signal. In the described embodiment, the IF reference signal is equal to 1/6 of the transmit frequency (TX) reference signal. A phase shifter 304 receives the IF reference signal (I component) and produces a corresponding Q component by shifting in phase the I component by 90 degrees. An I-Q mixer 302 separately mixes the I and Q components of the baseband signal with the I and Q components of the IF reference signal. The output of the I-Q mixer 302 is summed and band pass filtered by block 306, which produces the modulated IF signal.

The translational loop 204 includes a Phase and Frequency Detector (PFD) 308 that receives the modulated IF signal and produces an output that is received by a charge pump 310. Low Pass Filter (LPF) 312 filters the output of the charge pump 310 and the output of the LPF 312 drives a TX Voltage Controlled Oscillator (VCO) 314. The output of the TX VCO 314 serves as one input to the envelope adjust block 206, which is a mixer in the illustrated embodiment. The translational loop 204 also includes a mixer 316 that receives the output of the TX VCO 314 and a 7/6 TX reference signal from a local oscillator. The output of mixer 316 with 1/6 of the TX frequency serves as a second input to the PFD 308.

The envelope detection block 210 implements the second embodiment described above by calculating the I and Q components in a digital format. The envelope detection block 210 also includes processing operations to determine the magnitude of the envelope by calculating the square root of $(I^2+Q^2)$. When the envelope detection block 210 implements the third embodiment described above, it digitizes the modulated IF signal produced at the output of the I-Q IF modulator and determines the magnitude thereof.

The envelope time delay adjust block 212 includes a time delay block 322 and a Digital to Analog converter (DAC) 324. The time delay calibration block 214 includes a mixer 326 that mixes the RF signal produced by mixer 206 (envelope adjust block) with a local oscillator signal at a frequency equal to the TX carrier frequency to down convert the modulated TX signal to a complex baseband signal at the output of the mixer 326. An Analog to Digital Converter (ADC) 328 receives the output of the mixer 326 and converts the signal to a digital equivalent of the complex baseband signal. Both a Low Pass Filter (LPF) 330 and a Band Pass Filter (BPF) 332 filter the complex baseband signal. As an example of an operation that would be performed in an EDGE standard based cellular system, the LPF 330 would have a cutoff frequency ($F_c$) of 200 kHz, and the BPF 332 would have an $F_o$ of 500 kHz and a Bandwidth of 200 kHz.

The outputs of the LPF 330 and the BPF 332 are received by a level determination and control block 334 that produces the time delay control signal that is an input to the time delay block 322. In the described embodiment, the LPF 330 produces a signal that corresponds to a subject channel and the BPF 332 produces a signal that corresponds to an alternate channel (or adjacent channel). The level determination and control block 334 uses these signals to calculate an Alternate Channel Power Ratio (ACPR) that is the ratio of the Channel Power (CP) to the Alternate Channel Power (ACP). The ACPR is then compared to an allowable limit. If the ACPR meets this limit, the input to the time delay block 322 is properly set. However, if the ACPR does not meet this limit, the level determination and control block 334 adjusts the time delay control signal to the time delay block 322 until the limit is met.

Figure 4:
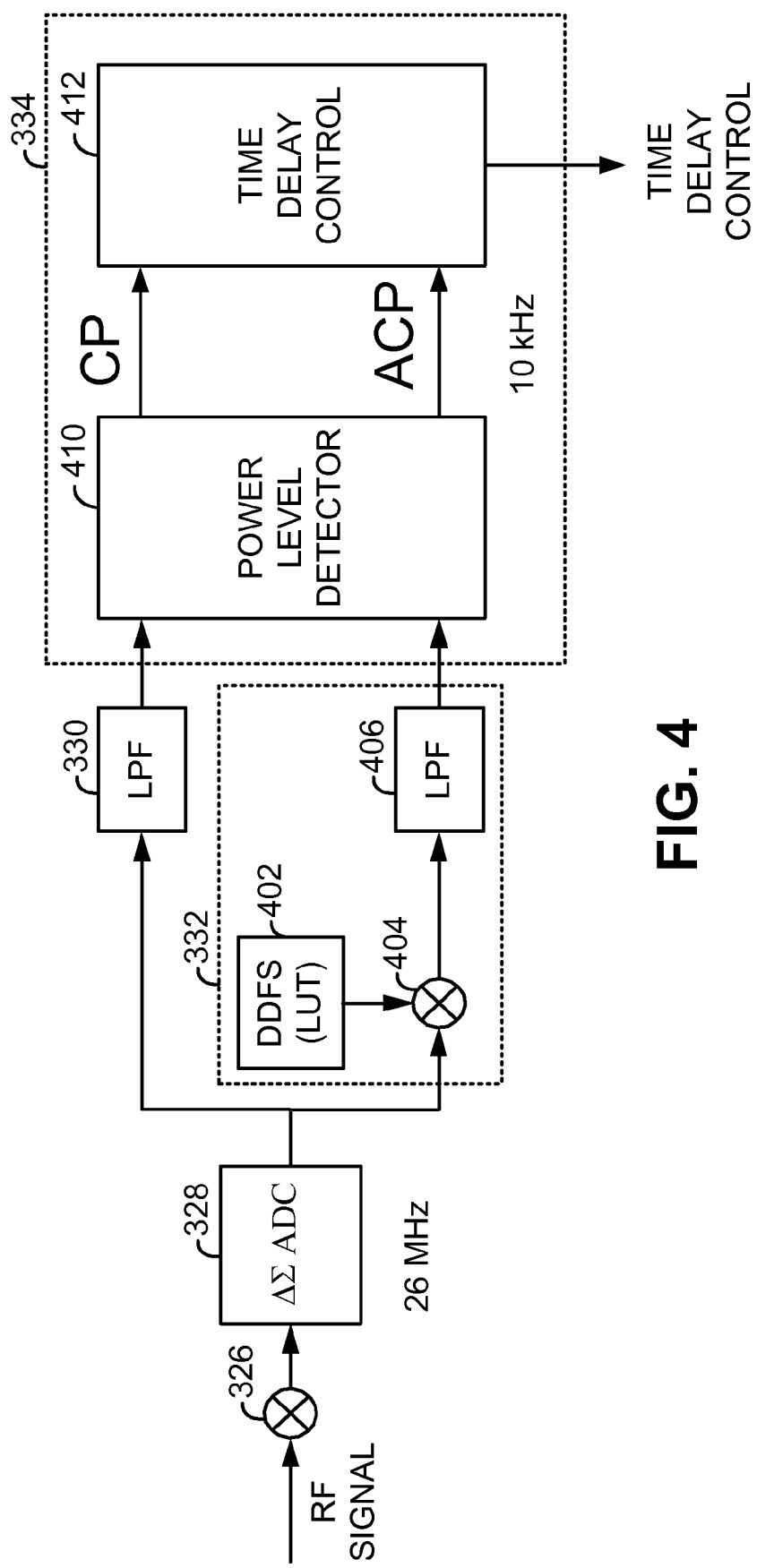
FIG. 4 is a block diagram illustrating another embodiment of the time delay calibration block of FIG. 2 that performs the Alternate Channel Power Ratio (ACPR) measurement operations.

FIG. 4 is a block diagram illustrating another embodiment of the time delay calibration block 214 of FIG. 2 that performs the ACPR measurement operations. As shown in FIG. 4, for hardware efficient filtering of the alternate channel signal, the BPF 332 includes a DDFS Look Up Table (LUT) 402, a complex mixer 404, and a LPF 406. Further, the level detection and control block 334 includes a power level detector 410 and a time delay control signal block 412. The power level detector 410 outputs detected levels of the CP and the ACP. Based upon a ratio of these measurements, the ACPR, the time delay control signal block 412 produces the time delay control signal.

Figure 5A:
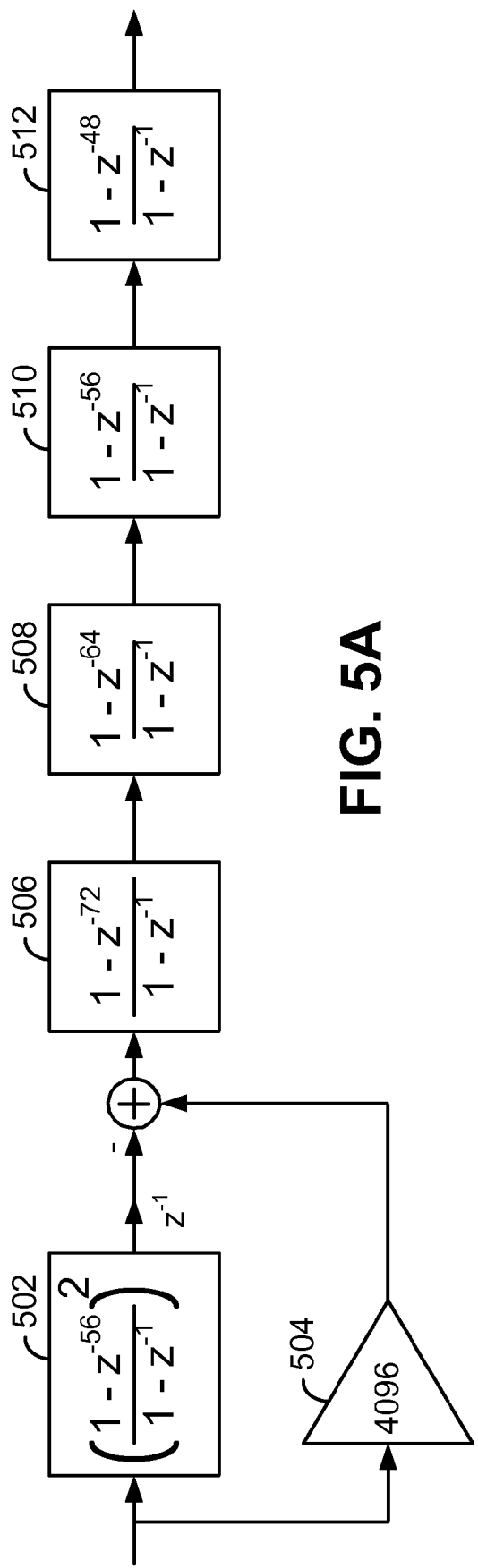
FIG. 5A is a block diagram illustrating a low pass filter employed in an ACPR measurement block constructed according to the present invention.

FIG. 5A is a block diagram illustrating a LPF employed in an ACPR measurement block constructed according to the present invention. The LPF includes filter operation blocks 502, 506, 510, and 512 and gain operator 504. The low pass filter of FIG. 5A may be employed for both/either of LPFs 330 and 406 of FIG. 4.

Figure 5B:
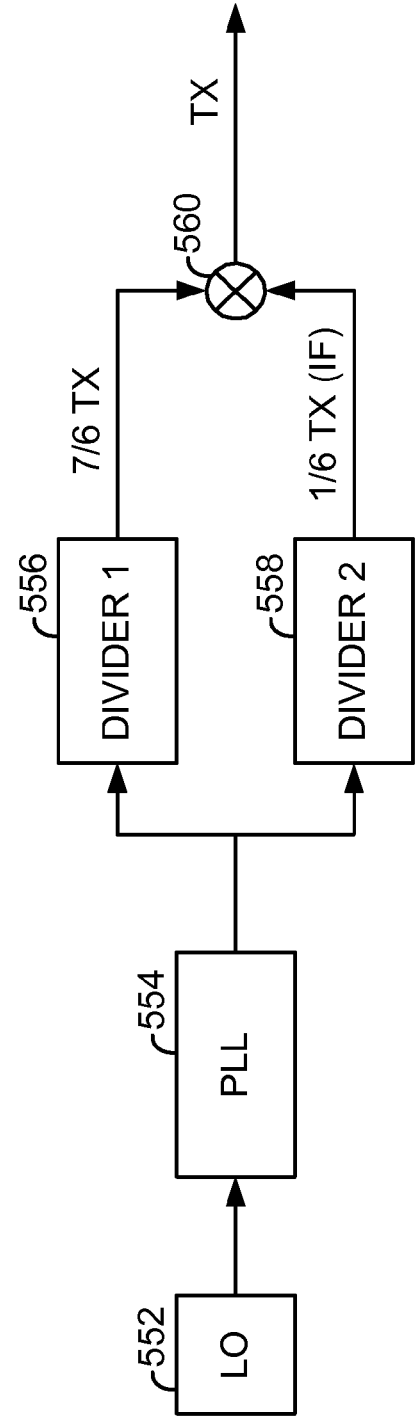
FIG. 5B is a block diagram illustrating a clock generation circuit constructed according to the present invention.

FIG. 5B is a block diagram illustrating a clock generation circuit constructed according to the present invention. As was described with reference to FIG. 3, various reference signals must be produced for the RF transmitter 200. These frequencies include ⅙ TX, TX, and ⅞ TX. In order to produce these frequencies, the clock generation circuit of FIG. 5B includes a Local Oscillator 552 that produces a clock reference signal. A Phase Locked Loop (PLL) 554 receives the clock reference signal and produces a frequency-multiplied output based thereupon. A first divider 556 receives the frequency-multiplied output and divides the signal to produce the ⅞ TX reference signal. A second divider 558 receives the frequency-multiplied output and divides the signal to produce the ⅙ TX (IF) reference signal. Further, in order to produce the TX reference signal (for use by the time delay calibration block 214), the ⅞ TX reference signal and the ⅙ TX reference signal are mixed via mixer 560 to produce the TX reference signal.

Figure 6:
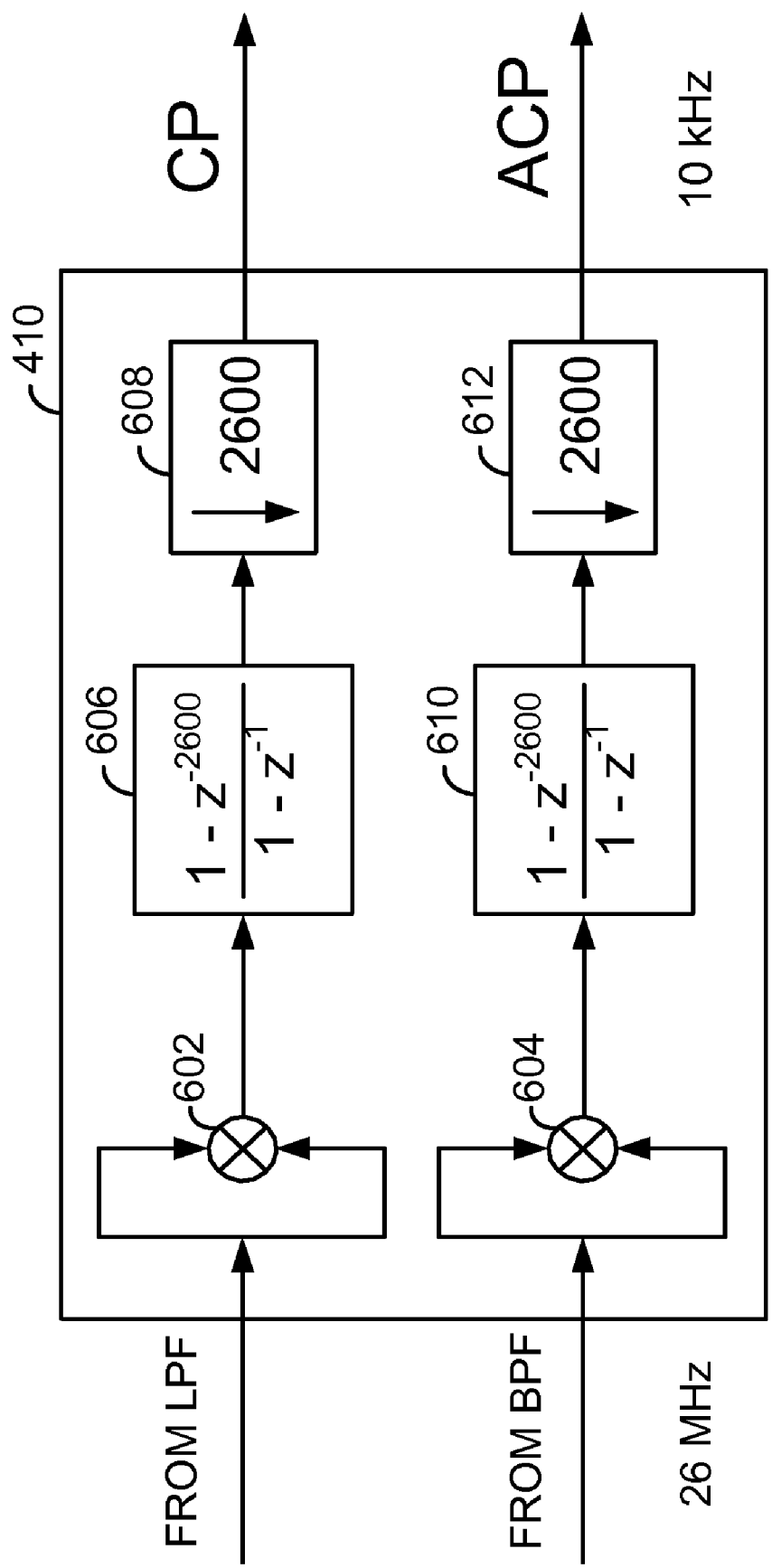
FIG. 6 is a block diagram illustrating a power level detector constructed according to the present invention.

FIG. 6 is a block diagram illustrating a power level detector constructed according to the present invention. As is shown, the power level detector includes a first mixer 602 that is employed to produce the Power Spectral Density (PSD) of the signal output by the LPF 330. Further, a second mixer 604 is employed to produce the PSD of the signal output by the BPF 332. Filtering blocks 606 and 610 filter the outputs of the mixers 602 and 604, respectively. Subsequently, the outputs of filtering blocks 606 and 610 are down sampled by down sampling blocks 608 and 612, respectively, to produce the CP and ACP signals, respectively. Note that the input to the power level detector 410 is at a sample rate of 26 MHz and that the output of the power level detector 410 is at a sample rate of 10 kHz.

Figure 7:
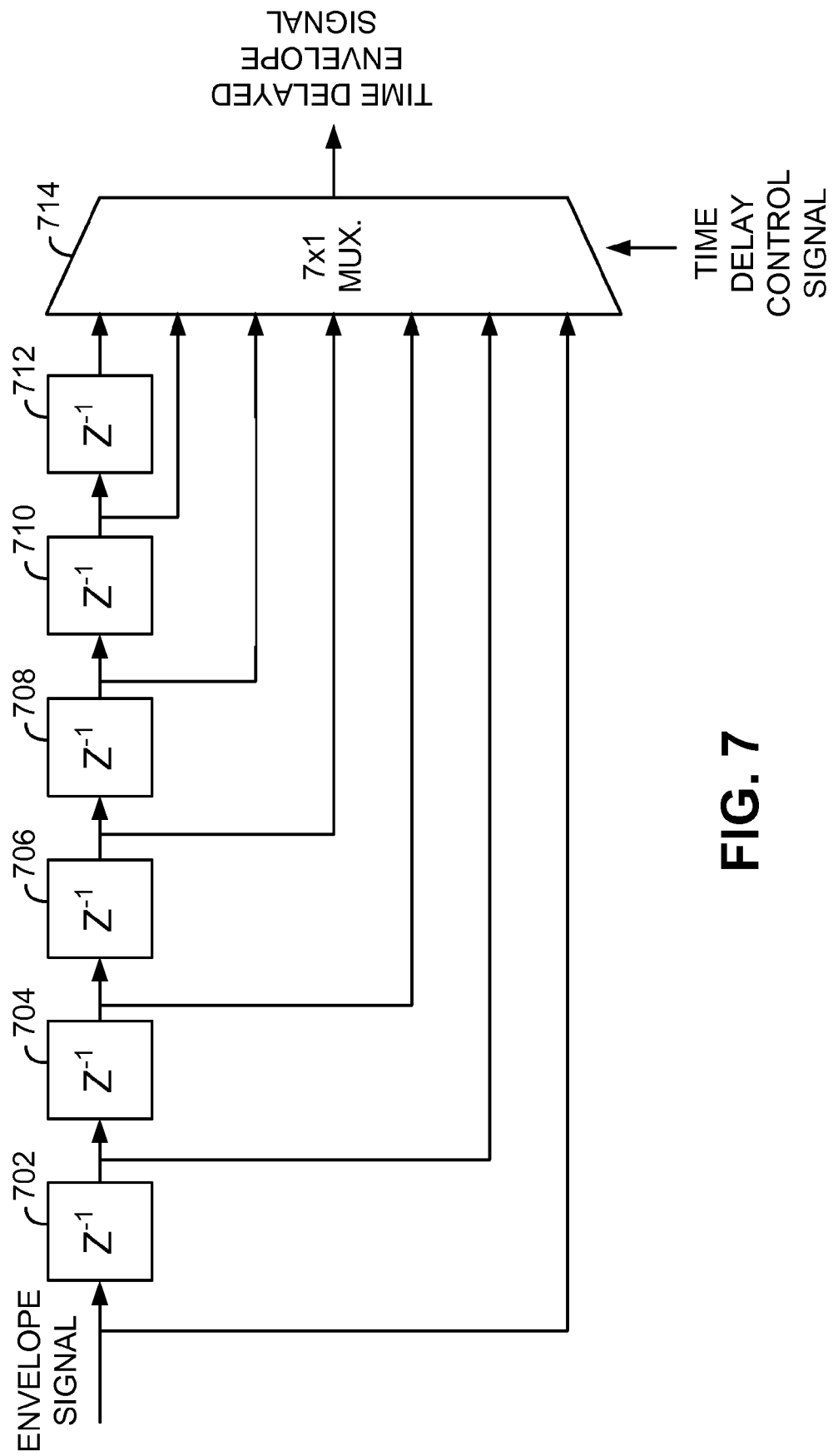
FIG. 7 is a block diagram illustrating a time delay block of the envelope time delay adjust block constructed according to the present invention.

FIG. 7 is a block diagram illustrating a time delay block 322 of the envelope time delay adjust block 212 constructed according to the present invention. The time delay block 322 receives as its input the envelope signal produced by the envelope detection block 210 and the time delay control signal produced by the time delay calibration block 214. The time delay block 322 includes a plurality of serially coupled delay elements 702-712. Multiplexer 714 receives as its input the envelope signal and the output of each of the serially coupled delay elements 702-712. The multiplexer 714 receives as its control input the time delay control signal from the time delay calibration block 214. As its output, the multiplexer 714 produces the time delayed envelope signal. The delay introduced by the delay elements 702-712 is determined based upon expected minimum and maximum delays that are required to compensate for the delay introduced by the translational loop 204 (and the I-Q IF modulator 202).

Figure 8:
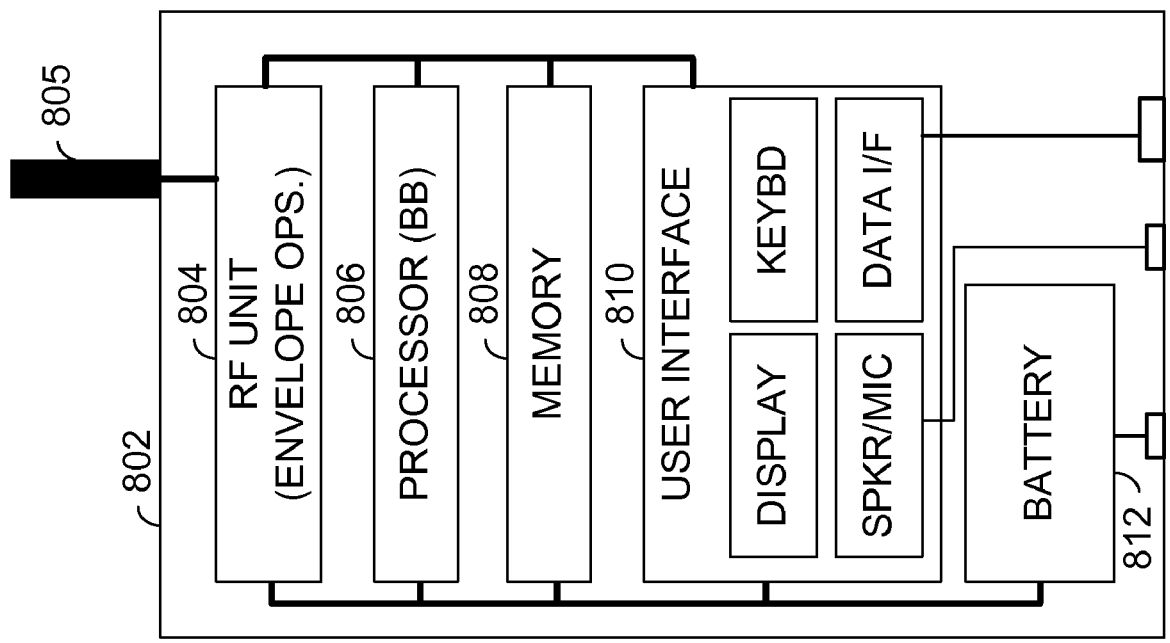
FIG. 8 is a block diagram illustrating a subscriber unit constructed according to the present invention.

FIG. 8 is a block diagram illustrating a subscriber unit 802 constructed according to the present invention. The subscriber unit 802 operates within a cellular system, such as the cellular system described with reference to FIG. 1A and according to the operations previously described with reference to FIGS. 2-7 and as will subsequently be described with reference to FIGS. 9-10B. The subscriber unit 802 includes an RF unit 804, a processor 806 that performs baseband processing and other processing operations, and a memory 808. The RF unit 804 couples to an antenna 805 that may be located internal or external to the case of the subscriber unit 802. The processor 806 may be an Application Specific Integrated Circuit (ASIC) or another type of processor that is capable of operating the subscriber unit 802 according to the present invention. The memory 808 includes both static and dynamic components, e.g., DRAM, SRAM, ROM, EEPROM, etc. In some embodiments, the memory 808 may be partially or fully contained upon an ASIC that also includes the processor 806. A user interface 810 includes a display, a keyboard, a speaker, a microphone, and a data interface, and may include other user interface components. The RF unit 804, the processor 806, the memory 808, and the user interface 810 couple via one or more communication buses/links. A battery 812 also couples to and powers the RF unit 804, the processor 806, the memory 808, and the user interface 810.

The RF unit 804 includes the RF transmitter components described with reference to FIG. 2 and operates according to the present invention to adjust the envelope of an RF signal produced by a translational loop contained therein. The structure of the subscriber unit 802 illustrated is only one particular example of a subscriber unit structure. Many other varied subscriber unit structures could be operated according to the teachings of the present invention. Further, the principles of the present invention may be applied to base stations, as are generally described with reference to FIG. 1A.

Figure 10A:
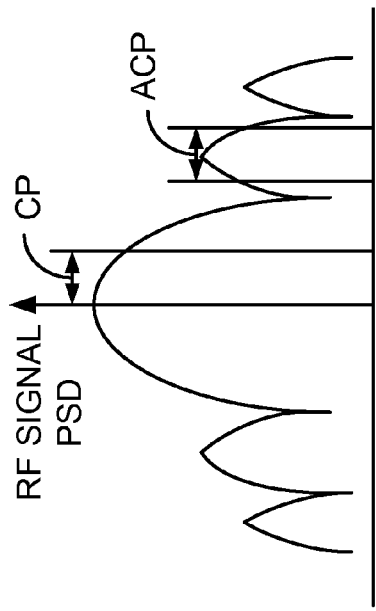
FIG. 10A is a graph illustrating the power spectral density of an RF signal generated by the RF transmitter of the present invention with an envelope adjust time delay mismatch.
Figure 10B:
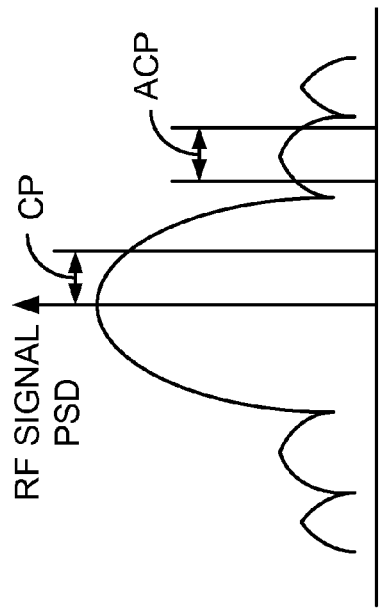
FIG. 10B is a graph illustrating the typical power spectral density of an RF signal generated by the RF transmitter of the present invention with the envelope adjust time delay correctly set.
Figure 9:
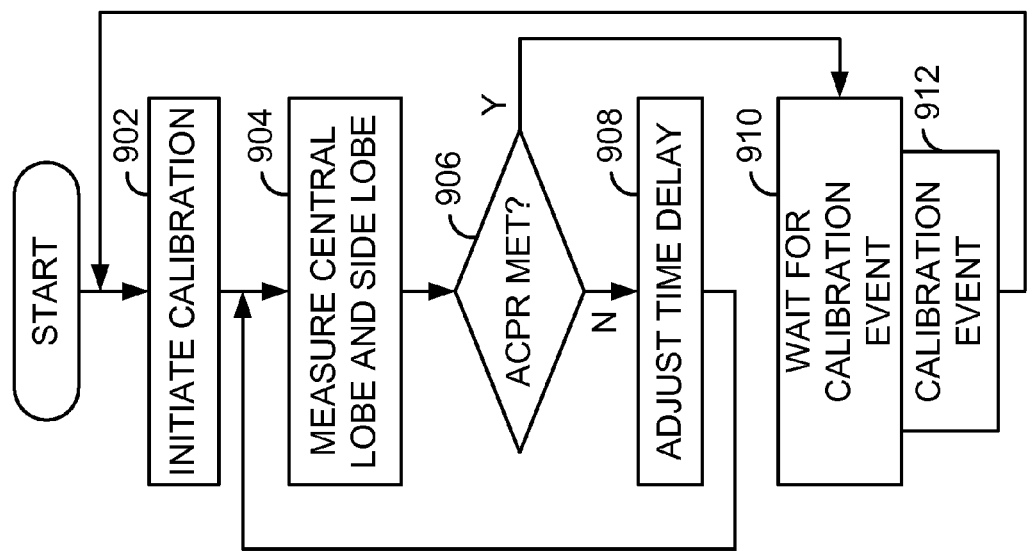
FIG. 9 is a logic diagram illustrating a method of operation according to the present invention.

FIG. 9 is a logic diagram illustrating a method of operation according to the present invention. Operation according to the present invention is initiated upon power up or reset. In such case, the operations of FIG. 9 will be performed along with a number of other operations required to set/reset the operation of a corresponding RF transmitter 200. The operations of FIG. 9 will be described with additional reference to FIGS. 10A and 10B. FIG. 10A is a graph illustrating the power spectral density of an RF signal generated by the RF transmitter 200 of the present invention with the time delay control signal improperly set. FIG. 10B is a graph illustrating the power spectral density of an RF signal generated by the RF transmitter 200 of the present invention with the time delay control signal properly set.

Referring again to FIG. 9, upon power up or reset, the calibration operations of the present invention are initiated (step 902). In such case, the components of the RF transmitter 200, e.g., RF transmitter 200 of FIG. 2, operate to produce the RF signal. The RF signal may have a power spectral density such as that shown in FIG. 10A. With the operations of the present invention, the CP (central lobe of the PSD) and the ACP (side lobe of the PSD) are measured (step 904). Then, the ratio of the CP to the ACP (or the ACP to the CP) is determined, i.e., ACPR. The ACPR is then compared to an ACPR threshold (step 906). This ACPR threshold relates directly to the permissible interference that operation on the channel may produce in the alternate channel (or adjacent channel).

With the PSD shown in FIG. 10A, the ACPR does not meet the threshold and the time delay control signal provided by the time delay calibration block 214 to the envelope time delay adjust block 212 is adjusted (step 908). Operation returns from step 908 to step 904 where the CP and ACP are again measured and the ACPR is determined. After one or more iterations of step 908, the PSD of FIG. 10B is produced such that the ACPR threshold is met at step 906. From step 906, with the ACPR met, operation proceeds to step 910 wherein the currently set time delay control signal produced by the time delay calibration block 214 is used. Operation remains at step 912 until a calibration event occurs. A calibration event may occur periodically or when a threshold is met.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A Radio Frequency (RF) transmitter comprising:
an Intermediate Frequency (IF) modulator that receives a modulated baseband signal and that produces a modulated IF signal having a non-constant envelope;
a translational loop that receives the modulated IF signal and that produces a modulated RF signal having a constant envelope;
an envelope time delay adjust block that receives an envelope signal corresponding to the modulated IF signal and that produces a time delayed envelope signal based upon a time delay control signal, the time delayed envelope signal being delayed in time with respect to the envelope signal by an amount corresponding to a delay introduced by at least the translational loop;
an envelope adjust block coupled to an output of the translational loop that adjusts the modulated RF signal based upon the time delayed envelope signal to produce an envelope adjusted modulated RF signal that has a non-constant envelope; and
a time delay calibration block that receives the envelope adjusted modulated RF signal and that produces the time delay control signal.

2. The RF transmitter of claim 1, wherein the time delay calibration block comprises:
a down converter that converts the envelope adjusted modulated RF signal to an baseband signal;
an Analog to Digital Converter (ADC) that samples the baseband signal;
a Low Pass Filter (LPF) that filters the baseband signal to produce a LPF output;
a Band Pass Filter (BPF) that filters the baseband signal to produce a BPF output; and
a level detector and control block that receives the LPF output and the BPF output and that produces the time delay control signal based upon the LPF output and the BPF output.

3. The RF transmitter of claim 2, wherein the BPF comprises:
a complex mixer; and
a LPF.

4. The RF transmitter of claim 1, wherein the time delay calibration block:
determines a channel power corresponding to the RF signal;
determines an alternate channel power corresponding to an alternate channel or an adjacent channel; and
determines the time delay control signal based upon a ratio of the channel power and the alternate channel power or adjacent channel power.

5. The RF transmitter of claim 1, further comprising an envelope detection block that produces the envelope signal.

6. The RF transmitter of claim 5, wherein the envelope detection block determines the envelope signal based upon the modulated baseband signal.

7. The RF transmitter of claim 5, wherein the envelope detection block determines the envelope signal based upon the modulated IF signal.

8. The RF transmitter of claim 5, wherein the envelope detection block receives the envelope signal from a coupled baseband processor.

9. The RF transmitter of claim 1, wherein:
the envelope signal is a digital signal; and
the time delayed envelope signal is an analog signal.

10. The RF transmitter of claim 9, wherein the envelope time delay adjust block comprises:
a time delay block that delays the digital envelope signal by a delay that is based upon the time delay control signal; and
a digital to analog converter that receives the output of the time delay block and that produces the time delayed envelope signal.

11. A wireless device comprising:
a case;
an antenna coupled to the case;
a baseband processor disposed within the case;
a Radio Frequency (RF) unit disposed within the case, coupled to the baseband processor, coupled to the antenna and having an RF transmitter comprising:
an Intermediate Frequency (IF) modulator that receives a modulated baseband signal and that produces a modulated IF signal having a non-constant envelope;
a translational loop that receives the modulated IF signal and that produces a modulated RF signal having a constant envelope;
an envelope time delay adjust block that receives an envelope signal corresponding to the modulated IF signal and that produces a time delayed envelope signal based upon a time delay control signal, the time delayed envelope signal being delayed in time with respect to the envelope signal by an amount corresponding to a delay introduced by at least the translational loop;

an envelope adjust block coupled to an output of the translational loop that adjusts the modulated RF signal based upon the time delayed envelope signal to produce an envelope adjusted modulated RF signal that has a non-constant envelope; and a time delay calibration block that receives the envelope adjusted modulated RF signal and that produces the time delay control signal.

12. The wireless device of claim 11, wherein the time delay calibration block comprises:

a down converter that converts the envelope adjusted modulated RF signal to an baseband signal;

an Analog to Digital Converter (ADC) that samples the baseband signal;

a Low Pass Filter (LPF) that filters the baseband signal to produce a LPF output;

a Band Pass Filter (BPF) that filters the baseband signal to produce a BPF output; and a level detector and control block that receives the LPF output and the BPF output and that produces the time delay control signal based upon the LPF output and the BPF output.

13. The wireless device of claim 11, wherein the time delay calibration block:

determines a channel power corresponding to the RF signal;

determines an alternate channel power corresponding to an alternate channel or an adjacent channel; and determines the time delay control signal based upon a ratio of the channel power and the alternate channel power.

14. The wireless device of claim 11, further comprising an envelope detection block that produces the envelope signal.

15. The wireless device of claim 14, wherein the envelope detection block determines the envelope signal based upon the modulated baseband signal.

16. The wireless device of claim 14, wherein the envelope detection block determines the envelope signal based upon the modulated IF signal.

17. The wireless device of claim 14, wherein the envelope detection block receives the envelope signal from a coupled baseband processor.

18. The wireless device of claim 11, wherein:
the envelope signal is a digital signal; and
the time delayed envelope signal is an analog signal.

19. The wireless device of claim 18, wherein the envelope time delay adjust block comprises:

a time delay block that delays the digital envelope signal by a delay that is based upon the time delay control signal; and a digital to analog converter that receives the output of the time delay block and that produces the time delayed envelope signal.

20. A method for producing a modulated RF signal having a non-constant envelope, the method comprising:

receiving a modulated baseband signal;

converting the modulated baseband signal to a modulated IF signal having a non-constant envelope;

converting the modulated IF signal to a modulated RF signal having a constant envelope using a translational loop;

receiving an envelope signal corresponding to the modulated IF signal;

producing a time delayed envelope signal based upon a time delay control signal, the time delayed envelope signal being delayed in time with respect to the envelope signal by an amount corresponding to a delay introduced by at least the translational loop;

adjusting the modulated RF signal at an output of the translational loop based upon the time delayed envelope signal to produce an envelope adjusted modulated RF signal that has a non-constant envelope; and producing the time delay control signal based upon the envelope adjusted modulated RF signal.

21. The method of claim 20, wherein producing the time delay control signal based upon the envelope adjusted modulated RF signal comprises:

converting the envelope adjusted modulated RF signal to an envelope adjusted modulated baseband signal;

low pass filtering the envelope adjusted modulated baseband signal to produce a low pass filtered output;

band pass filtering the envelope adjusted modulated baseband signal to produce a band pass filtered output; and determining the time delay control signal based upon the ratio of the band pass filtered output to the low pass filtered output.

22. The method of claim 20, wherein producing the time delay control signal based upon the envelope adjusted modulated RF signal comprises:

determining a channel power corresponding to the RF signal;

determining an alternate channel power corresponding to an alternate channel or an adjacent channel; and determining the time delay control signal based upon a ratio of the channel power and the alternate channel power.

23. The method of claim 20, further comprising determining the envelope signal based upon the baseband signal.

24. The method of claim 20, further comprising determining the envelope signal based upon the modulated IF signal.

25. The method of claim 20, further comprising receiving the envelope signal from a coupled baseband processor.

* * * * *